C. D. PIERCE.
Earth-Augers.

No. 8,016. Reissued Dec. 25, 1877.

Attest:
R. G. Orwig.
C. A. Johnson.

Inventor:
Charles D. Pierce
By Thomas G. Orwig,
attorney.

N. PETERS, PHOTO-LITHOGRAPHER, WASHINGTON, D. C.

UNITED STATES PATENT OFFICE.

CHARLES D. PIERCE, OF PHILADELPHIA, PENNSYLVANIA.

IMPROVEMENT IN EARTH-AUGERS.

Specification forming part of Letters Patent No. 141,664, dated August 12, 1873; Reissue No. 8,016, dated December 25, 1877; application filed December 8, 1876.

*To all whom it may concern:*

Be it known that I, CHARLES D. PIERCE, of Philadelphia, in the county of Philadelphia and State of Pennsylvania, have invented an Improved Earth-Auger, of which the following is a specification:

The object of my invention is to save time and labor in excavating wells and in forming bores in the earth of various diameters and depths, and for various purposes.

It consists, first, in constructing an auger in two parts, and connecting them with a central shaft in such a manner that the auger-pods will be inclined crosswise, and stand in twisted positions relative to each other; second, in turning the vertical edges of the auger-pods inward to pack and retain dirt, and to aid in ventilating the bore at all times while the auger is in operation; third, in having the outer corners of the cutting-bits extend farther from the center than any other portion of the auger, for the purpose of cutting a bore larger than the auger; fourth, in having the inner corners of the cutting-bits in advance of the outer corners, to produce an outward rotary draw-cut; fifth, in having two independent cutters, standing in reverse positions relative to each other, and each cutter or bit extended beyond the central line of the auger, so as to bring the cutting-edges into twisted positions relative to each other, to cut simultaneously in the same direction from the bottom of the bore when the auger is rotated, to perform the functions of a screw and centering point in drawing, feeding, and holding the auger steadily to work, and to elevate and support the dirt cut loose from the bottom of the bore.

Figure 1:
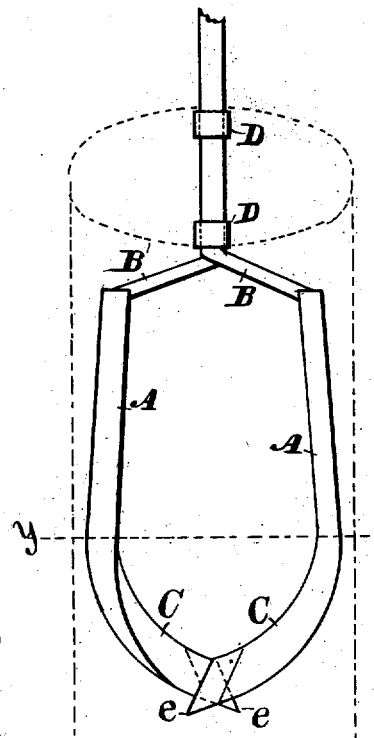

Figure 1 of my drawing is a side elevation of my auger, illustrating the manner of forming two independent halves, to be connected at their tops to the bottom end of a central rotating shaft.

A A represent the half-augers, in the form of pods, riveted to elbow-formed arms, and terminating in cutters C C at their bottoms. In cross-section each of these pods presents an oblong curved form or portion of an ellipse, and the rounded ends of each such cross-section turn inward toward the center of the bore.

By this peculiarity of my pods a vacant space is preserved on each side of the auger from its top to its bottom, to afford ventilation at all times while the auger is in operation.

The rounded vertical sides of the pods, each of which has its edge inclined toward the center of the bore, form four distinct bearings, that aid in pressing and packing the loose dirt into a solid core, and in retaining the dirt and core thus formed between the two distinct pods until elevated and released by opening the auger, a result that is greatly advantageous, in that it dispenses with the necessity of combining a bucket or closed cylinder with the cutters to elevate dirt.

B B are the arms carrying the half-augers. These arms are clamped to the lower end of the central rotating auger-shaft by means of the sliding collars D D, or rigidly secured thereto in any suitable way.

Figure 2:
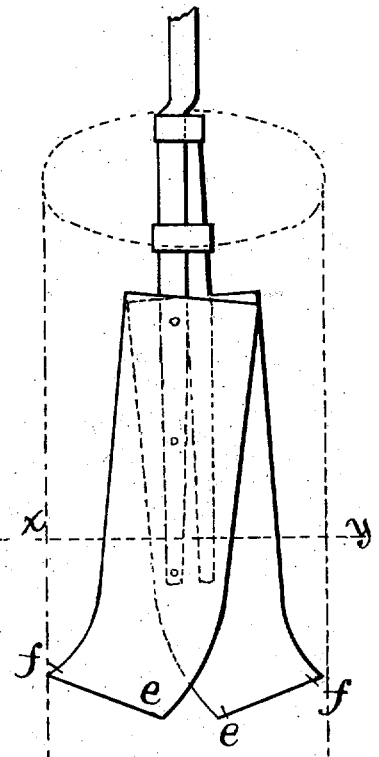

Fig. 2 is an elevation of my auger, taken at a right-angled line or point of vision relative to the side elevation, Fig. 1.

A A are the auger-pods, rigidly fixed to the arms B B in such a manner as to incline crosswise and in opposite directions from each other and from the rotating auger-shaft and the vertical central line of the bore. The arms may be perpendicular, and the pods fixed thereto in angling positions, as shown, or the arms may be inclined in opposite directions, and the pods fixed straight thereto, to bring their edges in parallel line with the inclined arms, to produce the same results.

By this peculiarity of my auger the pods and half-augers are brought into twisted positions relative to each other, and wider apart at the bottom than at the top, so that the top portion of the auger is never liable to come into contact with the wall of the bore, as is frequently the case with straight augers when the shaft and auger is out of a perpendicular line in the bore. Binding and friction of the auger against the wall of the bore are thereby entirely prevented.

*e e* are the inner and lower corners of the cutting-edges of the half-augers. *f f* are the upper and outer corners, extending beyond the diameter and circumference of any other part of the auger, as required to cut a bore larger in diameter than the body of the auger. By thus extending the cutting-points *f* beyond the diameter I provide ventilation at all times between the auger and the wall of the bore, and also prevent friction between the auger and the wall of the bore, so that it requires less power to rotate and lift the auger, and thereby facilitates the operation of boring, and saves power, time, and expense.

Figure 3:
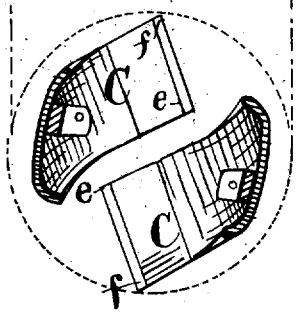

Fig. 3 is a horizontal section of Fig. 1 at the line *y y* looking downward. It is clearly illustrated by this figure that the cutters C C pass a given diameter of the bore (indicated by a circular broken line) in opposite directions, and that the inner corner *e* of each cutter is in advance of its outer corner *f*, and that the cutting-edges and lines *e f* form separate angles, running in opposite directions relative to a central line drawn across the bore.

This peculiarity exists continually when the auger is rotated, and the advantageous result is a constant or continued rotary draw-cut from the inner or lower corners *e* to the outer and upper corners *f*, and the turning of the dirt inward and upward, to prevent it from getting outside of the bucket and auger, as is frequently the case in the use of level cutters.

Figs. 2 and 3, jointly considered, fully and clearly illustrate that the lines formed by the two cutting-edges *e f*, respectively, form angles in opposite directions relative to a horizontal central line drawn through the bore, and also form angles in opposite directions relative to the vertical axis of the bore, and that each cutter C presents two oblique lines, one from its inner corner *e* upward to the outer corner *f*, and one from the cutting front edge *e f* rearward and upward to the pod A.

By these joint peculiarities a draw and slicing cut, starting from the inner lower corners *e* and terminating at the outer upper corners *f*, is produced, and my auger is thus made to cut deepest in the center of the bore, which results in giving a vertical drawing and feeding force to the cutters that will hold the auger steady and cause it to penetrate the earth and to elevate the dirt.

By thus dispensing with a centering-point and screw, I am enabled to penetrate all kinds of ground, strata of coal, slate, mica, and other hard substances usually found in horizontal layers, sheets, and scales, and to excavate, loosen, and elevate stones that may be met in the line of the bore much more easily than with cutters whose entire cutting-edges are presented and engaged at the same time to meet much resistance, and to be thereby made to slip over the hard substances without penetrating and getting under the matter to loosen it.

I am aware that disk-form and bowl-shaped auger-cutters have been made and connected eccentrically with a centering-point in such a manner as to have the inner and lower corners of their cutting-edges in advance of their outer and upper corners, to produce a rotary draw-cut, and to extend the outer corners beyond every other portion of the same cutters.

Figure 4:
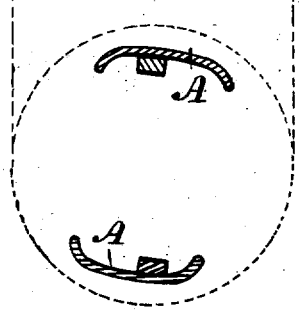

Fig. 4 is a horizontal section of Fig. 2 through the line *x x*, and shows the position of the body of the auger A A relative to the circumference and wall of the bore, as indicated by the circular broken line, and also the partially elliptical or oblong form presented by each of my pods in its cross-section.

The two halves of the auger A A, terminating in inwardly-inclined cutters C C, that pass each other in opposite directions, and have their inner corners *e* in advance of their outer corners *f*, as shown and described, brings the inclined cutting portions and bottoms into twisted positions relative to each other. By this peculiarity the half-augers A A are made to co-operate in performing the functions of a spiral flange on a central shaft, in aiding the cutters to cut loose and elevate dirt from the bottom of the bore, and the complete auger economizes greatly in well-boring and mining operations.

I claim as my invention—

1. The auger-pods A A, inclining crosswise and in opposite directions to each other, in combination with the arms B B, substantially as and for the purposes shown and described.

2. The auger-pods A A, each having its vertical edges turned inward, to present a partially elliptical or oblong form in its cross-section, substantially as shown and described, to aid in ventilating the bore and to pack and retain the dirt, as set forth.

3. The auger-cutter A, terminating in an inclined cutter, C, which extends its outside and upper corner *f* outward beyond every other portion of the complete auger, as and for the purposes set forth.

4. The independent half-augers A C, having no connection at their lower ends, and their inclined cutters passing the central line of the bore in opposite directions with the inners corners *e* in advance of their outer corners *f*, as and for the purposes set forth.

5. The independent half-augers A C, having their outer corners *f* higher than their inner corners *e*, as and for the purposes set forth.

6. The cutters C C, each having an upward inclination from its inner corner *e* to its outer corner *f*, and also an upward inclination from the cutting front edge *e f* rearward, thereby forming spiral twists relative to the vertical center of the complete auger and its bore, substantially as and for the purposes shown and described.

7. The two independent cutters C C, standing crosswise and in twisted positions relative to each other, and each cutter extended beyond the central line of the bore, in combination with the arms B B and a central rotating shaft, to bring the cutting-edges *e f* into twisted positions relative to each other, substantially as and for the purposes shown and described.

CHARLES D. PIERCE.

Witnesses:
A. A. GRACE,
HENRY S. PARMALEE.